United States Patent [19]
Karlsson et al.

[11] Patent Number: 5,884,192
[45] Date of Patent: *Mar. 16, 1999

[54] DIVERSITY COMBINING FOR ANTENNAS

[75] Inventors: Jonas Karlsson, Stockholm; Ulf Forsén, Saltsjö-Boo; Roland Bodin, Spånga, all of Sweden

[73] Assignee: Telefonaktiebolaget LM Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 889,808

[22] Filed: Jul. 8, 1997

Related U.S. Application Data

[63] Continuation of Ser. No. 678,197, Jul. 12, 1996, abandoned, which is a continuation of Ser. No. 253,294, Jun. 3, 1994, abandoned.

[51] Int. Cl.$^6$ ........................................... H04B 1/40
[52] U.S. Cl. ........................ 455/562; 455/132; 455/137; 455/436; 375/229; 375/347
[58] Field of Search ................. 455/33.3, 219, 455/132, 133, 134, 135, 136, 137, 138, 139, 223, 272, 276.1, 279.1, 282, 561, 562, 507, 424, 436, 440, 442, 443, 444, 447; 375/229, 347

[56] References Cited

U.S. PATENT DOCUMENTS

| | | | |
|---|---|---|---|
| 3,593,147 | 7/1971 | Gurak | 455/219 |
| 3,633,107 | 1/1972 | Brady | 325/267 |
| 4,293,955 | 10/1981 | Gehr et al. | 455/276 |
| 4,369,520 | 1/1983 | Cerny et al. | 455/137 |
| 4,544,927 | 10/1985 | Kurth et al. | 343/373 |
| 5,031,193 | 7/1991 | Atkinson et al. | 375/13 |
| 5,065,411 | 11/1991 | Muto | 375/100 |
| 5,067,147 | 11/1991 | Lee | 379/60 |
| 5,067,173 | 11/1991 | Gordon et al. | 359/152 |
| 5,274,844 | 12/1993 | Harrison et al. | 455/25 |
| 5,361,404 | 11/1994 | Dent | 455/135 |
| 5,428,818 | 6/1995 | Meidan et al. | 455/33.3 |
| 5,530,725 | 6/1996 | Koch | 375/347 |
| 5,530,925 | 6/1996 | Garner | 455/273 |

FOREIGN PATENT DOCUMENTS

| | | |
|---|---|---|
| 457 448 | 11/1991 | European Pat. Off. . |
| 460 748 | 12/1991 | European Pat. Off. . |
| 540 387 | 5/1993 | European Pat. Off. . |
| 637 878 | 2/1995 | European Pat. Off. . |
| 639 035 | 2/1995 | European Pat. Off. . |
| 1 567 888 | 5/1980 | United Kingdom . |
| WO91/20142 | 12/1991 | WIPO . |
| WO93/12590 | 6/1993 | WIPO . |

OTHER PUBLICATIONS

S. Choi, "Adaptive Antenna Array Utilizing the Conjugate Gradient Method for Multipath Mobile Communication," *Signal Processing*, vol. 29, pp. 319–333 (1992).

J. H. Winters, "Optimum Combining in Digital Mobile Radio with Cochannel Interference," *IEEE Trans. on Veh. Tech.*, vol. VT–33, No. 3, pp. 144–155 (Aug. 1984).

*Primary Examiner*—Wellington Chin
*Assistant Examiner*—Lee Nguyen
*Attorney, Agent, or Firm*—Burns, Doane, Swecker & Mathis, L.L.P.

[57] ABSTRACT

An antenna configuration increases the sensitivity of a base station by providing a plurality of antennas each of which cover a disjunct or partially disjunct area of a larger cell. A receiver for each antenna receives signals transmitted from mobile stations. Equalizers are attached to each receiver for correcting the received signals. A combiner then combines the received signals from the different antennas so as to form an estimate of the transmitted signal.

8 Claims, 4 Drawing Sheets

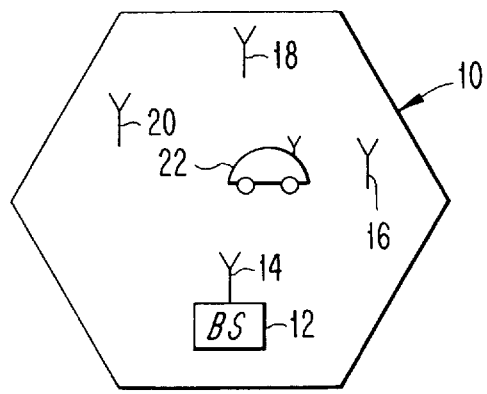
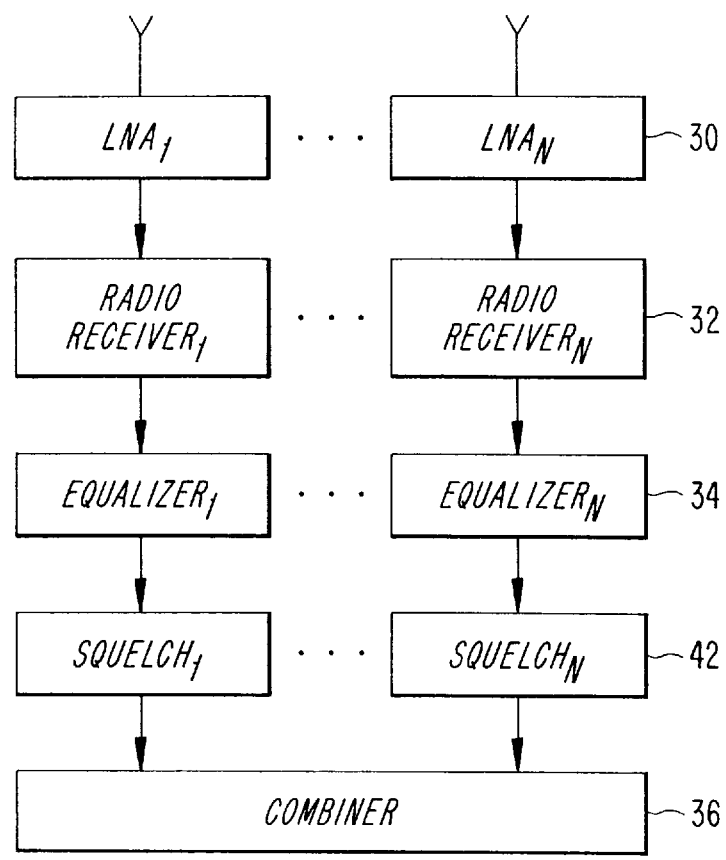

DIVERSITY COMBINING FOR ANTENNAS

This application is a continuation of application Ser. No. 08/678,197, filed Jul. 12, 1996, which is a continuation of application Ser. No. 08/253,294, filed Jun. 3, 1994 now abandoned.

FIELD OF THE INVENTION

The present invention relates to an antenna configuration for use by base stations in a cellular communication system, and more particularly to an antenna configuration which is comprised of a plurality of antennas for increasing the sensitivity and range of a cellular communication system.

BACKGROUND OF THE DISCLOSURE

In recent years, the importance of radio based telephony has increased rapidly. Among the many reasons for this is the added flexibility for the user, and relatively high costs of installing the cables needed in the fixed telephone network. A radio based telephone system consists of so called cells, each of which receives radio coverage from a certain radio base station. The base stations are in turn connected to the fixed telephone network through a special switching node. A typical cellular communication system is illustrated in FIG. 1.

FIG. 1 illustrates ten cells, the C1–C10 in a typical cellular mobile radio communication system. Normally, a cellular mobile radio system would be implemented with more than ten cells. However, for the purposes of simplicity, the present invention can be explained using the simplified representation illustrated in FIG. 1. For each cell, C1–C10, there is a base station, B1–B10, with the same reference number as a corresponding cell. FIG. 1 illustrates the base stations as situated in the vicinity of the cell center and having omnidirectional antennas. The base station could also be situated at a cell border and use directional antennas.

FIG. 1 also illustrates nine mobile stations, M1–M9, which are movable within a cell and from one cell to another. In a typical cellular radio system, there would normally be more than nine cellular mobile stations. In fact, there are typically many times the number of mobile stations as there are base stations. However, for the purposes of explaining the present invention, the reduced number of mobile stations is sufficient.

Also illustrated in FIG. 1 is a mobile switching center MSC. The mobile switching center MSC is connected to all ten base stations B1–B10 by cables. The mobile switching center MSC is also connected by cables to a fixed switched telephone network or similar fixed network. All cables from the mobile switching center MSC to the base station B1–B10 and cables to the fixed network are not illustrated.

In addition to the mobile switching center MSC illustrated, there may be additional mobile switching centers connected by cables to base stations other than those illustrated in FIG. 1. Instead of cables, other means, for example, fixed radio links, may also be used to connect base stations to mobile switching centers. The mobile switching center MSC, the base stations, and the mobile stations are all computer controlled.

As the popularity of cellular communications systems increases, the existing cellular systems become more and more crowded. As a result, it is desirable to increase the range and/or capacity of the cellular system. Furthermore, it is desirable to reduce the cost of new cellular communication systems. One way to lower costs is to use fewer base stations to cover a certain area. However, as the range of each base station is expanded, the sensitivity of each base stations' receiver must be increased if the mobile station output power is unchanged.

The current digital cellular systems employ base stations which separate mobile signals using time and frequency orthogonality. Signals from a mobile station propagate to a base station and the signals are received at a single or sometime double antenna which are closely spaced, e.g., approximately 20 wavelengths. The receiver processes the signal using time and frequency orthogonality to separate signals from different users. While techniques such as frequency hopping and advance coding techniques provide ways for lowering co-channel interference, these techniques are inherently limited by the available frequency spectrum. However, the use of directional sensitivity of adaptive antennas offers a new way of reducing co-channel interference. An adaptive antenna consists of an array of spatially distributed antennas. Impinging on the array are signals from a plurality of transmitters. By properly combining the antenna outputs, it is possible to extract individual signals from the received superposition, even if they occupy the same frequency band. Furthermore, a beamforming matrix can be used to shape the reception patterns for the antenna array. As a result, the beamforming matrix has a plurality of outputs each corresponding to a section of the cell. The best combination of outputs is then used when analyzing the detected signals.

SUMMARY OF THE INVENTION

It is an object of the present invention to increase the range of a cellular communication system by increasing the sensitivity of each base station within the cellular communication system. The sensitivity of the base station is increased by providing a plurality of antennas each of which cover a disjunct or partially disjunct area of a larger cell. In the present invention, the signals from the mobile stations situated in areas covered by more than one antenna are automatically combined thereby achieving an automatic and smooth transition between different areas within the large cell when the mobile stations move within the cell. Another object of the present invention is to provide a flexible system in which the number of antennas, the antennas types, and the placement of the antennas can be varied without any strong constraints on their placement.

According to one embodiment of the present invention, a cellular communication system with a plurality of base stations and a plurality of mobile stations is disclosed. Each base station is connected to a plurality of antennas located at the same or different antenna sites which cover disjunct or partially disjunct areas. In addition, receiving means for each antenna are provided for receiving transmitted signals from the mobile stations. Equalizer means are attached to each receiver for correcting the received signals. Finally, a combining means combines the received signals from different antennas so as to form an estimate of the transmitted signals.

According to another embodiment of the present invention, antenna arrays can be located at the antenna sites. When antenna arrays are used at an antenna site, a beamforming means can be used to generate a plurality of beams which cover disjunct or partially disjunct sections of a cell.

BRIEF DESCRIPTION OF THE DRAWING

The present invention will now be described in more detail with reference to preferred embodiments of the invention, given only by way of example, and illustrated in the accompanying drawings, in which:

FIG. 2 illustrates a cell in a cellular communication system according to one embodiment of the present invention;

FIG. 3 illustrates the receiver structure according to one embodiment of the present invention;

DETAILED DESCRIPTION OF THE DISCLOSURE

Figure 1:
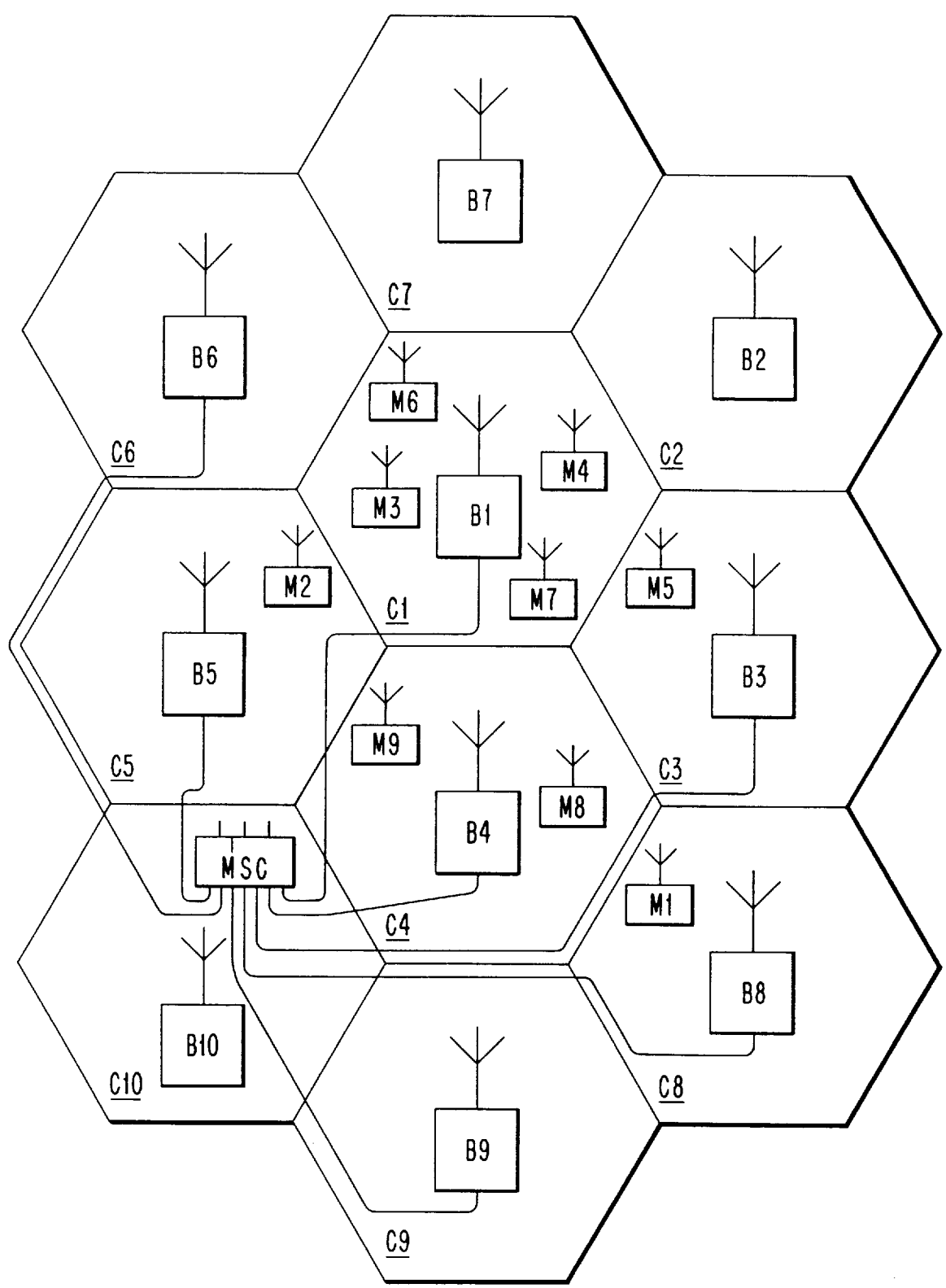
FIG. 1 illustrates a typical cellular radio communication system.

The present invention is primarily intended for use in cellular communication systems, although it will be understood by those skilled in the art that the present invention can be used in other various communication applications.

One embodiment of the present invention will now be described with reference to FIG. 2 which illustrates a single cell 10 which is part of a larger cellular communication system. In this example, the cell 10 contains a base station 12 and four antennas 14, 16, 18, and 20 which are located at different antenna sites. It will be understood by one skilled in the art that the present invention can be configured with any plurality of different antenna sites within a cell. By providing the base station 12 with four antennas, the size of the cell 10 can be four times the size of a single antenna cell without increasing the power of the mobile station. Each antenna is connected in some manner to the base station 12 so that the signals received by each antenna are sent to the base station 12. For example, the antennas can be connected to the base station by cables, optical signalling means or by radio signalling means.

As illustrated in FIG. 3, each antenna is connected to its own low noise amplifier 30, a radio receiver 32, and an equalizer 34. The low noise amplifier 30 amplifies the signals received by the antenna. The amplified signals are then processed by the receiver 32 in a known manner. These signals are then sent to the equalizer 34 which forms soft values for the received signal in a known manner. The soft values formed by the equalizers contain information regarding the certainty of whether the detected symbols are actually the transmitted symbols. For example, a convenient representation of binary signals is +1 and −1. If the soft values add up to zero then the equalizers do not know what was sent. However, a positive value indicates that the +1 symbol was sent and a negative value indicates that the −1 symbol was sent. The larger the positive or negative value, the more certain the equalizers are about the detected symbols. According to the present invention, the soft values from each equalizer for each signal are then combined in a combiner 36 at the base station in a known manner such as maximal ratio combining. It will be understood by those skilled in the art that the dividing line between components contained at the antenna and the base station can be placed anywhere between the low noise amplifier 30 and the combiner 36.

In another embodiment of the present invention, a squelch means 42 can be connected between the equalizer 34 and the combiner 36 for disconnecting antenna branches which have, for example, a received signal energy or quality below a predetermined value, a received signal energy or quality below an adjustable value, or for disconnecting a number of branches with the lowest received signal energy or quality where the number of branches disconnected is determined by the number of branches and the antenna constellation. The squelch may also disconnect an antenna branch based upon historical information that, for example, could indicate the presence of a co-channel interferer with the same training sequence as the desired mobile. The options listed above are dependent on the equalizer and indirectly on the length of the training sequence. For example, assuming a known and ideal channel and no implementation losses, the equalizers will deliver perfect soft values and the maximal ratio combining is achieved by just adding the soft values from all of the branches. As a result, squelches would not be needed in this example.

Referring back to FIG. 2, all of the antennas cover a disjunct or partially disjunct area. Thus, four antenna can cover a cell with an area four times as large as a single antenna cell without increasing the power of the mobile stations. When a mobile station 22 is located in an area which is covered by both antennas 16 and 18, a signal transmitted to the base station 12 is received by the antennas 16 and 18. The received signals are then processed at each antenna according to the above description. The soft values from each equalizer are then automatically combined at the base station 12. By combining the signals from different antennas, the base station generates a better estimate of the received signal. Furthermore, since the signals are automatically combined, the present invention does not have to perform handovers when the mobile stations move from one coverage area to another within the cell 10.

Figure 4:
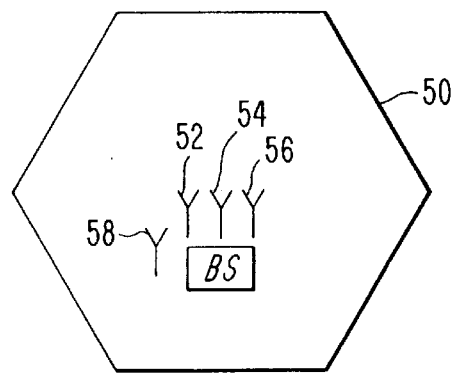
FIG. 4 illustrates a cell in a cellular communication system according to one embodiment of the present invention.

According to another embodiment of the present invention, the antennas can be placed at the same antenna site as illustrated in FIG. 4. In FIG. 4, four antennas 52, 54, 56, and 58 are located around one antenna site, In this embodiment, each antenna only covers approximately a quarter of the large cell 50. After the signals from the four antennas are combined, the antennas cover the whole cell 50.

Figure 5:
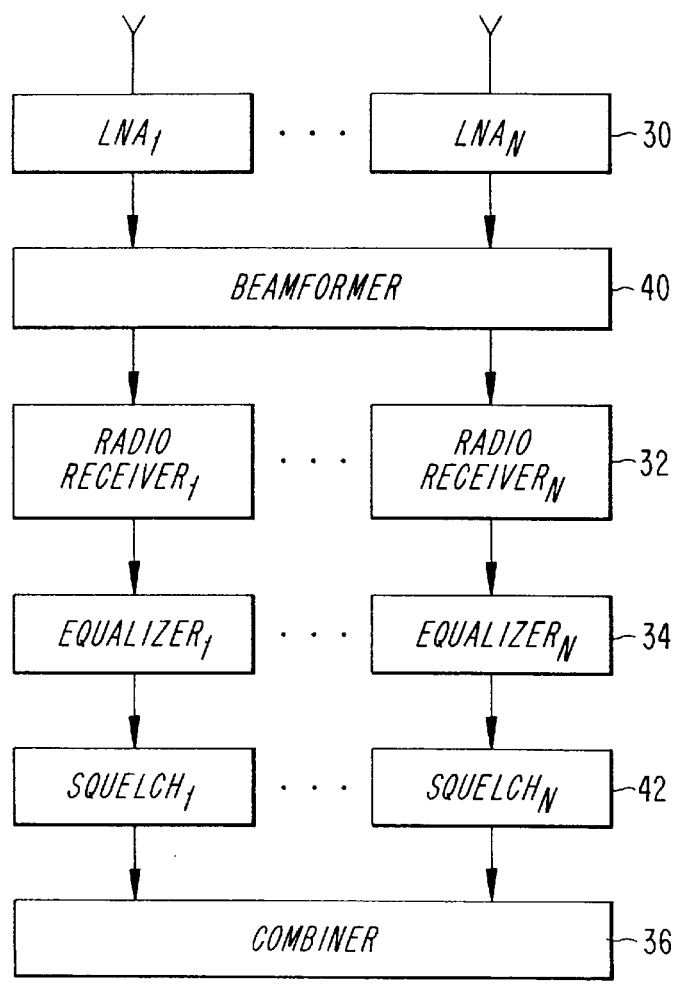
FIG. 5 illustrates a receiver structure according to another embodiment of the present invention.
Figure 6:
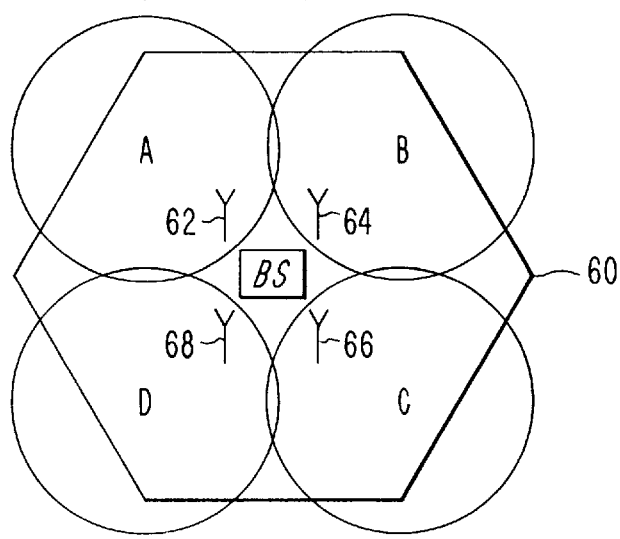
FIG. 6 illustrates a cell in a cellular communication system according to one embodiment of the present invention.
Figure 7:
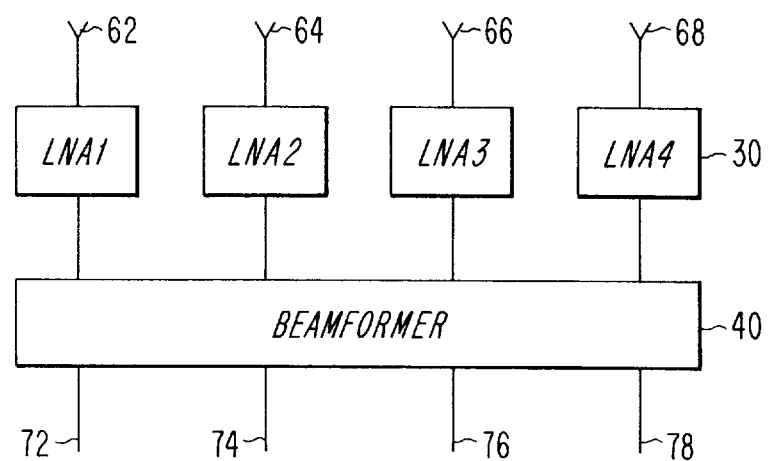
FIG. 7 illustrates a receiver structure according to one embodiment of the present invention.

As illustrated in FIG. 5, when an antenna site contains an antenna array, a beamforming matrix 40 can be included either before or after the low noise amplifier 30. The beamforming matrix 40 forms a plurality of beams, wherein each beam covers a disjunct or a partially disjunct section of the cell. The beamforming matrix may, for example, be a butler matrix. As illustrated in FIGS. 6 and 7, the beamforming matrix has an output for each of the sections of the cell. The beamforming matrix can be used so that output 72 covers section A, output 74 covers section B, output 76 covers section C, and output 78 covers section D of the large cell 60, wherein the sections are disjunct or partially disjunct. An advantage of the present invention is that at least several if not all of the outputs from the beamforming matrix are used in determining the detected signals. As a result, the present invention achieves an automatic and smooth transition between different areas when the mobile moves from one area to another within the large cell without needing to perform a handoff.

The present invention can also take advantage of polarization diversity to decrease the effects of fading. The fading for the vertical and horizontal parts of a radio wave are almost totally uncorrelated, i.e., independent from each other. In the present invention, the antennas can be either vertically or horizontally polarized or mixed. For example, some of the antenna sites may contain horizontally polarized antennas while the remaining antenna sites may contain vertically polarized antennas. Alternatively, each antenna site could contain both horizontally and vertically polarized antennas. Furthermore, a single physical antenna can provide polarization diversity.

It will be appreciated by those of ordinary skill in the art that the present invention can be embodied in other specific forms without departing from the spirit or central character thereof. The presently disclosed embodiments are therefore considered in all respects to be illustrative and not restrictive. The scope of the invention is indicated by the appended claims rather than the foregoing description, and all changes which come within the meaning a range of equivalence thereof are intended to be embraced therein.

We claim:

1. In a radio communication system having a first communication station, the first communication station defining a cell, and a mobile station positionable within the cell, the mobile station at least for transmitting uplink signals to the first communication station, an apparatus for the first communication station for recreating the uplink signals transmitted thereto by the mobile station, said apparatus comprising:

a first antenna defining a first antenna area encompassing a first portion of the cell, the first antenna for detecting uplink signals transmitted by the mobile station when the mobile station is positioned in at least the first antenna area;

at least a second antenna defining at least a second antenna area encompassing a second portion of the cell, said at least second antenna area at least partially disjunct from the first antenna area defined by said first antenna, said at least second antenna for detecting uplink signals transmitted by the mobile station when the mobile station is positioned in at least the at least second antenna area;

receiver circuitry coupled to said first antenna and to said second antenna, said receiver circuitry for receiving indications of the uplink signals detected by said first and at least second antennas, respectively, and for forming processed signals indicative of the uplink signals received at each of said first and at least second antennas;

equalizer circuitry coupled to receive the processed signals formed by said receiving circuitry, said equalizer circuitry for equalizing each of the processed signals and for generating soft values containing information regarding the certainty of whether a detected symbol is actually a transmitted symbol from the mobile station;

a combiner for combining the soft values for forming an estimated signal representative of an estimate of the uplink signal transmitted by the mobile station when positioned at any location within the first and at least second antenna area defined by said first and at least second antennas, thereby to provide handoff-free reception of the uplink signals as the mobile station moves between the first antenna area and the at least second antenna area.

2. The apparatus of claim 1, wherein the first antenna area and at the at least second antenna area defined by said first antenna and said second antenna, respectively, together substantially encompass the cell.

3. The apparatus of claim 1, further comprising squelching circuitry coupled between said equalizer circuitry and said combiner to receive the equalized signals, said squelching circuitry for selectively squelching the equalized signals received thereat.

4. The apparatus of claim 3, wherein said squelching circuitry squelches equalized signals applied thereto of signal energy levels beneath selected levels.

5. The apparatus of claim 3, wherein said squelching circuitry squelches equalized signals applied thereto of signal quality levels beneath selected levels.

6. The apparatus of claim 3, wherein said squelching circuitry squelches signals responsive to historical information.

7. The apparatus of claim 1, further comprising a beamformer, said beamformer coupled to said first antenna and said at least second antenna, together forming an antenna array which selectively defines the first antenna area and the at least second antenna area.

8. The apparatus of claim 1, wherein said first antenna is polarized in a first polarization direction and said second antenna is polarized in a second polarization direction.

* * * * *